T. S. E. DIXON.
Car Starter.
No. 96,557.
Patented Nov. 9, 1869.
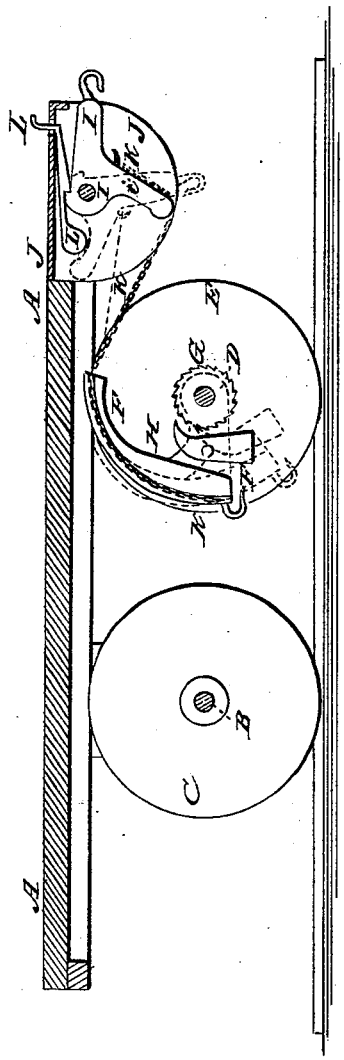
Witnesses:
Inventor:
T. S. E. Dixon
PER
Attorneys

United States Patent Office.

T. S. E. DIXON, OF JANESVILLE, WISCONSIN, ASSIGNOR TO HIMSELF AND WILLIAM H. PAYNE, OF SAME PLACE.

Letters Patent No. 96,557, dated November 9, 1869.

IMPROVED STREET-CAR STARTER.

The Schedule referred to in these Letters Patent and making part of the same.

*To all whom it may concern:*

Be it known that I, T. S. E. DIXON, of Janesville, in the county of Rock, and State of Wisconsin, have invented a new and useful Improvement in Car-Starters; and I do hereby declare that the following is a full, clear, and exact description thereof, which will enable others skilled in the art to make and use the same, reference being had to the accompanying drawing, forming part of this specification.

The figure is a side view of my improved device, part being broken away, to show the construction.

My invention has for its object to furnish an improved device for attachment to horse-cars and other wheel-vehicles, by the use of which the power will be first applied to revolve the wheels of the vehicle, and thus start it with less effort than when the draught is applied directly to the body of the car; and It consists in the construction and combination of the various parts of the device, as hereinafter more fully described.

A represents the body or frame of the car; B represents the rear axle; C, the rear wheels; D, the fore axle; and E, the fore wheels; about the construction of which parts there is nothing new.

F is a curved arm or segment of a wheel, through a hole in one end of which passes the axle D, so that the said arm or segmental wheel may ride upon the said axle.

The part of the arm or wheel F that rides upon the axle D is slotted, to receive the ratchet-wheel G, securely and rigidly attached to the axle D.

In the inner part of the slot in the arm or wheel F is pivoted the pawl H, the rear end of which is so weighted, and which is so formed, that when the said arm is lowered, the weight of the pawl H will cause the forward end of said pawl to take hold of the teeth of the ratchet-wheel G, so that as the arm F is drawn upward and forward, the power will be applied to revolve the axle and wheels to start the car.

As the arm F moves forward, bringing the pawl H above the axle, the weight of the pawl will detach it from the ratchet-wheel G, and hold it away from said wheel until the arm or wheel F is again lowered.

I is the draught-bar, which is pivoted to the car-frame or to a casing or frame, J, attached to said car-frame, and which is made in about the manner shown in the figure, that is to say, with a downwardly-projecting arm or arc, *i'*, as shown.

K is a chain, the forward end of which is attached to the draught-bar I at the base of the forward side of the arm I'.

The chain K passes along the forward side of the arm *i'*, across the end of said arm, back to and along the convex side of the arm or wheel F, and is secured to the lower or rear end of said arm or segment F.

L is a lever-catch, the rear end of which is weighted, and the forward end of which extends up through the bottom of the car or platform into such a position that it may be reached and operated by the driver with his foot.

The lever-catch L is made with a shoulder upon its under side, in the rear of its pivoting point, which, when the draught-bar I is raised into a horizontal position, catches upon a shoulder formed upon the rear part of the upper side of the draught-bar I, so as to support said bar, and prevent its dropping down.

When about to start the car, the driver steps upon the projecting forward end of the lever-catch L, allowing the draught-bar I *i'* to drop by its own weight. This slackens the chain K, and allows the arm or segment F to drop by its own weight.

If now the draught is applied, its first application is to the ratchet-wheel G, revolving the axle and wheels, and thus starting the car with a much less outlay of power than would be necessary were the draught applied directly to the body of the car in the ordinary manner.

Having thus described my invention,

What I claim as new, and desire to secure by Letters Patent, is—

1. The curved arm or segmental wheel F and weighted pawl H, in combination with a ratchet-wheel attached to the axle or wheels of the vehicle, substantially as and for the purpose set forth.

2. The pivoted draught-bar I, formed with an arm, *i'*, when used in connection with the arm or segmental wheel F, and pivoted weighted pawl H, substantially as herein shown and described, and for the purpose set forth.

3. The combination of the pivoted and weighted lever-catch L with the draught-bar I and the frame of the car, substantially as herein shown and described, and for the purpose set forth.

T. S. E. DIXON.

Witnesses:
W. A. LOWELL,
CHAS. W. McHENRY.